Nov. 11, 1930.    F. B. TOWNSEND    1,781,611
BASKET HANDLE
Filed Aug. 7, 1928
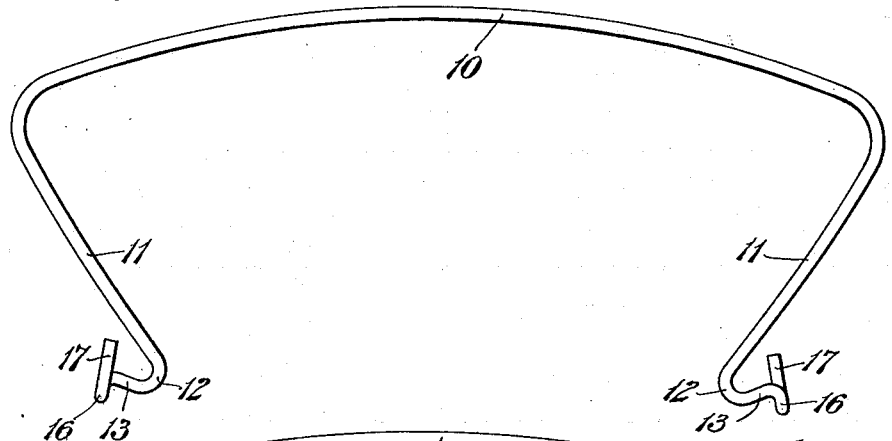
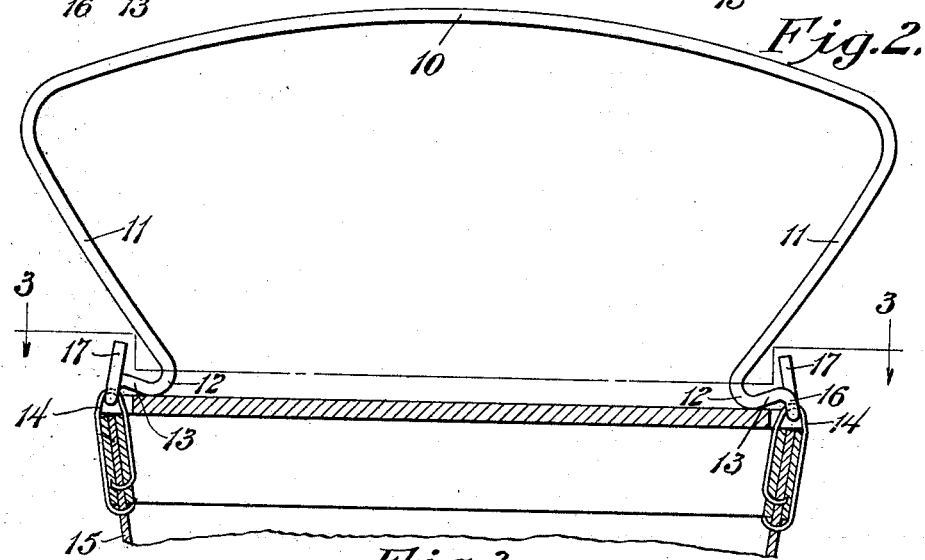
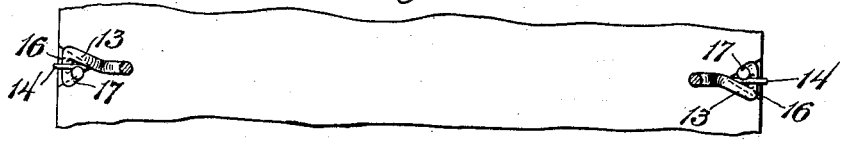
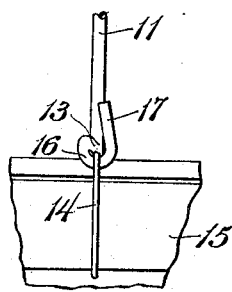
INVENTOR
Frank B. Townsend,
BY
Siggers & Adams
ATTORNEYS Patented Nov. 11, 1930

1,781,611

UNITED STATES PATENT OFFICE

FRANK B. TOWNSEND, OF PENN YAN, NEW YORK, ASSIGNOR OF ONE-HALF TO JOHN E. McMATH, OF PENN YAN, NEW YORK

BASKET HANDLE

Application filed August 7, 1928. Serial No. 298,065.

This invention relates to handles for fruit baskets and aims, among other objects, to provide an improved wire handle adapted to be detachably connected to eyes or staples on a berry basket or the like and having provision to hold down the basket lid. Further, it aims to provide an improved basket and handle assembly which permits the baskets to be nested and carried to a field while the handles are carried separately and means whereby handles can be very easily and quickly assembled on the baskets ready for picking berries.

In the accompanying drawings wherein the preferred form of handle assembly is shown for illustrative purposes, Fig. 1 is a side elevation of the wire handle ready to be applied to a basket;

Fig. 2 is a side elevation of one of the handles applied to an ordinary grape basket, a fragment of the basket being shown in section;

Fig. 3 is a sectional view taken on the line 3—3 of Fig. 2 and

Fig. 4 is a fragmentary, elevational view taken at one side of the basket and showing one of the handle hooks.

Referring particularly to the drawing, the preferred form of basket handle, there shown, comprises a wire bail 10 having downwardly and inwardly inclined arms 11, each presenting a shoulder portion 12 adapted to snap over the edge of a basket lid in much the same fashion as the handle shown in my co-pending application, Serial No. 262,432, and entitled Wire handle for fruit baskets, filed March 17, 1928. The end portions of the handle are bent outwardly and slightly upwardly to present shoulders 13 which engage the top of the lid as clearly shown in Fig. 2.

Herein, the handle hooks are arranged to engage eyes 14, shown as being ordinary staples which extend across the top edges of the basket 15 above the reinforcing bands, the idea being to permit the hooks of the handle to be threaded in the eye while the handle is held crosswise of the basket. For this purpose the hooks are formed by bending the wire downwardly at 16 and then upwardly at 17 so that the upwardly projecting ends will prevent the handle from being accidentally disengaged from the eyes while it is holding down a lid. As will be seen, in Fig. 4, the upper ends of the projections 17 lie in substantially the same plane as that of the basket handle.

The handle and its attaching eyes or staples are designed to cooperate with the ordinary notched basket lid so that the hooks on the handle will rest partly in the notches after the lid has been snapped in place under the shoulder portions 13. Moreover, the arrangement is such that the shoulders on the handle are effective when the handle is swung down to lie flatly across the top of the lid. This is one of the features that is desired by many fruit packers, especially those who handle mushrooms and the like. It has the advantage of permitting baskets to be stacked lengthwise, one on top of the other, so that they require less shipping space than baskets having upright handles.

To preclude any possibility of dislodging the handle from its eyes, the hooks at the opposite ends of the handle preferably have their terminals bent upwardly and outwardly in opposite directions so that their projecting ends 17 are adapted to be threaded into the eyes from opposite sides; that is to say, the hook on one end of the handle is inserted through its eye on one side and the hook at the other end of the handle is inserted through the opposite eye from the other side, so that when the handle is struck a blow or pressure is applied to it in any direction, it will be impossible to dislodge one of the hooks from its eye even though the other hook may dig into or split the basket lid and be disengaged. However, both of the hooks may be made exactly alike and may be inserted from the same side of the eyes if so desired.

From the foregoing description, it will be seen that the handles may be made very economically of single pieces of wire and that the handle receiving eyes may be made of wire staples and applied by automatic stapling machines. However, metallic ears or the like may be employed if so desired.

The handles have the very distinct advantage of permitting them to be threaded into the eyes or basket staples by an unskilled fruit picker. It is only necessary for him to place the handle crosswise of the basket and thread the projecting ends in the eyes in a manner which will be obvious to him. Furthermore, the arrangement permits all of the baskets to be nested together in stacks, to be carried to a field or orchard, while the handles are carried separately. This permits a single picker to handle many times the number of baskets that he could if the basket handles were assembled beforehand.

Obviously, the present invention is not restricted to the particular embodiment thereof herein shown and described.

What is claimed is:—

1. In combination with a fruit basket, a pair of handle receiving eye members on opposite sides and arranged transversely of and above the side walls of the basket; and a wire handle presenting open hooks so shaped as to be inserted freely in said eyes while the handle extends across the basket and so as to interlock with the eye members to prevent the handle from being disengaged from either eye due to pressure on the handle or pressure on the sides of the basket.

2. In combination with a fruit basket, a pair of handle receiving eyes on opposite sides extending transversely and above the side edges of the basket; a wire handle having hooks removably engageable with said eyes while the handle is held crosswise of the basket and shaped to interlock with said eyes so as to prevent accidental disengagement by lateral pressure on the sides of the basket; and shoulder portions on said handle adapted to engage the top of the basket cover to hold it in place.

3. In combination with a fruit basket of the character described, staples secured to the rim on opposite sides of the basket and presenting handle-receiving eyes straddling the rim; a lid on the basket having notches to straddle said eyes; a wire handle having terminal hooks engaged in said eyes and so shaped as to prevent accidental disengagement therefrom due to pressure on the sides or on the handle and to permit the handle to swing down over the lid; and shoulders on the handle adjacent to the hook ends to hold down the lid.

4. In combination with a fruit basket of the class described, a pair of handle receiving eyes extending above and crosswise of the rim on opposite sides of the basket; a bail-shaped handle having terminal hooks presenting upstanding and outwardly curved end portions shaped to be threaded freely into the eyes, one through one side of one eye and the other through the opposite side of the other eye while the handle is held crosswise of the basket and also shaped to interlock with the eye members and thereby prevent the handle from being accidentally displaced by pressure on the sides; and shoulders on the handle arranged to snap over the basket lid to hold it down, the lid having notches co-operating with the hooks to lock the handle on the basket and permitting the handle to be swung down over the lid.

5. A wire handle for fruit baskets having downwardly and inwardly bent arms adapted to snap over a basket lid; outwardly bent lid engaging shoulders to engage the top of a lid; and eye engaging hooks adapted to be freely inserted in and interlock with eyes arranged transversely of and above the side walls of a basket, said hooks lying in planes substantially at right angles to the plane of the eyes and having upwardly projecting ends lying in substantially the same plane as that of the handle whereby to prevent the hooks from being accidentally disengaged from the eyes.

6. In combination with a fruit basket having transverse handle-receiving eyes extending across the opposite edges of the basket rim and a lid having notches straddling said eyes, a bail-shaped wire handle presenting downwardly and inwardly bent arms overlying the lid; outwardly bent shoulder portions at the lower ends of said arms; hooks formed on the ends of said shoulder portions and lying in planes substantially perpendicular to the plane of said handle; and upwardly and outwardly bent terminals so shaped as to prevent said hooks from being accidentally disengaged from the eyes.

In testimony, that I claim the foregoing as my own, I have hereto affixed my signature.

FRANK B. TOWNSEND.